United States Patent [19]

Bradbury

[11] Patent Number: 4,847,940
[45] Date of Patent: Jul. 18, 1989

[54] WINDSHIELD WIPER BLADE

[75] Inventor: James W. Bradbury, Middletown, Ohio

[73] Assignee: Xermac, Inc., Royal Oak, Mich.

[21] Appl. No.: 200,248

[22] Filed: May 31, 1988

[51] Int. Cl.$^4$ ................................................. B60S 1/38
[52] U.S. Cl. ............................... 15/250.40; 15/250.36
[58] Field of Search ......................... 15/250.36–250.42

[56] References Cited

U.S. PATENT DOCUMENTS

| | | | |
|---|---|---|---|
| 1,755,155 | 4/1930 | Storrie | 15/250.40 |
| 2,589,339 | 3/1952 | Carson | 15/250.40 X |
| 2,641,789 | 6/1953 | Rappl | 15/250.4 X |
| 4,473,919 | 10/1984 | Fritz, Jr. | 15/250.4 X |

FOREIGN PATENT DOCUMENTS

| | | | |
|---|---|---|---|
| 583367 | 9/1933 | Fed. Rep. of Germany | 15/250.41 |
| 67650 | 4/1986 | Japan | 15/250.41 |

*Primary Examiner*—Peter Feldman
*Attorney, Agent, or Firm*—Brooks & Kushman

[57] ABSTRACT

A windshield wiper blade made of a synthetic elastomeric material includes an elongated body having a longitudinal axis, a longitudinally extending central squeegee rib and a longitudinally extending scraping rib immediately adjacent to and on each side of the squeegee rib. All three of the ribs are integral with the body and project outwardly in the same direction from the body. The squeegee rib has a greater radial length than the scraping rib. Each of the scraping ribs has one 90 degree scraping edge and the squeegee rib has a pair of 90 degree squeegee edges. The one squeegee edge and the one scraping edge on the side facing the direction of movement of the blade engage the windshield. The scraping rib on the other side of the squeegee rib is out of contact with the windshield but engages the squeegee rib to effect lateral stiffness of the squeegee rib. A mounting rib is integral with the body and projects outwardly therefrom at a location essentially diametrically opposite the squeegee rib. The mounting rib provides a longitudinally extending hinge about which the body can swing in either direction.

4 Claims, 1 Drawing Sheet

U.S. Patent     Jul. 18, 1989     4,847,940
*Fig. 1*
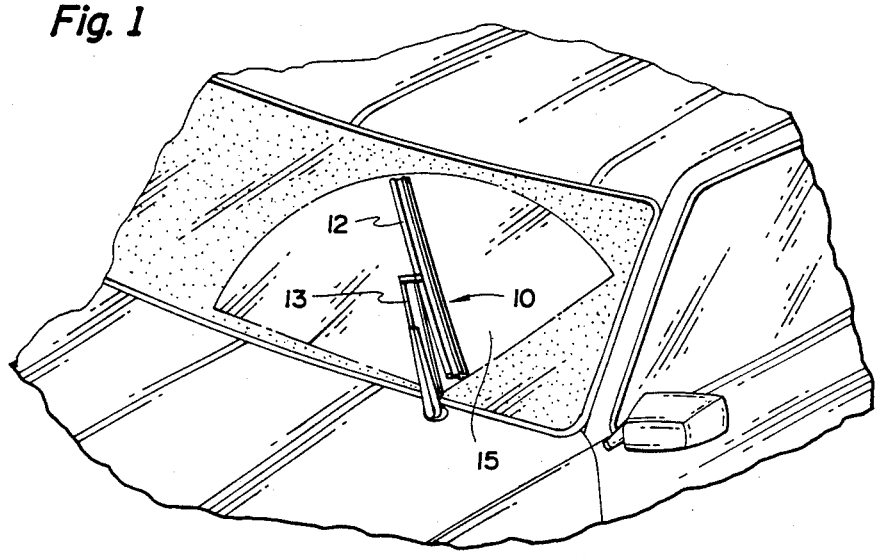
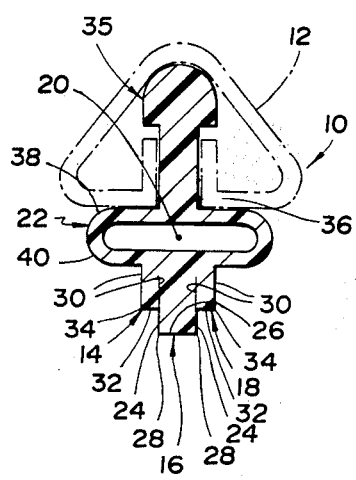
*Fig. 2*
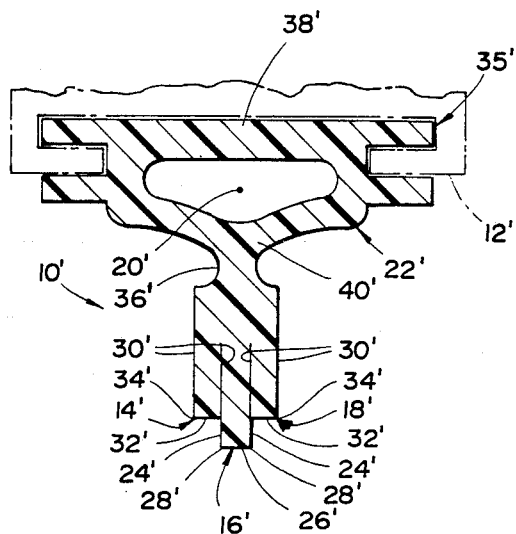
*Fig. 3*

WINDSHIELD WIPER BLADE

TECHNICAL FIELD

This invention relates to windshield wiper blades and, in particular, to windshield wiper blades made of a synthetic, elastomeric material

BACKGROUND ART

Windshield wiper blades are used to wipe away snow, sleet, rain, water or condensed moisture along with oil, insects, tree sap, dirt and other foreign matter from a vehicle windshield. The blades should have a long useful life to avoid frequent replacement. However, it is well recognized that worn wiper blades develop a tendency to streak or smear and to wear out in the sense that longitudinal portions of the length of the blades cease to perform a useful cleaning action after a relatively short period of use. These disadvantages are difficult to eliminate because of a large number of variables, such as chemical resistance to ozone and sunlight, tear resistance, flexibility, tensile strength, hardness, rigidity and abrasiveness of the blade and uniformity of wiping pressure and contact with the windshield along the length of the blade.

Many attempts have been made to improve wiper blade performance as by providing special contours in the cross-section of the blade, especially the wiping rib or ribs by selection of a blade material, by chemical treatment of the blade and by varying the design of the blade holder. Nevertheless, the problem of streaking or smearing persists.

One prior art wiping blade comprises a number of strips of rubber of varying heights which are assembled with a crimped spine. The strips are of rubber. Each rib includes a 90 degree cut edge of which more than one is in contact with the surface at all times. One problem with the use of such a construction is manufacturing cost.

The U.S. Pat. No. to Fritz, Jr. 4,473,919 discloses a windshield wiper blade comprising a tubular body portion made up of two semicircular sections of different diameter connected by radially extending shoulders. Five ribs project from the small diameter section generally radially with respect to the longitudinal axis of the body. The middle rib of the five constitutes a squeegee rib and is longer radially than the two scraping ribs. Diametrically opposite the squeegee rib is a T-shaped mounting rib which serves the dual purpose of providing a means by which the blade is attached to the windshield wiper mechanism and also functions as a hinge which allows the blade to rotate at the reversal point of each wiping stroke so as to engage the scraping ribs on opposite sides of the squeegee rib with the windshield.

Other prior art patents which disclose wiper blades generally of the type to which this invention relates are U.S. Pat. Nos. 3,881,212, 3,636,583, 2,798,242, 2,589,339, 2,543,383, 2,295,011, 2,006,322, 3,417,421, 1,816,370, 3,428,997 and 3,566,432.

The single greatest factor in wiping efficiency and service life seems to be the maintenance of a sharp wiping contact edge. Once this edge starts to lose its sharpness, the wiping action deteriorates rapidly.

SUMMARY OF THE INVENTION

An object of the present invention is to provide an improved windshield wiper blade which has improved non-streaking characteristics and longer operating life than blades heretofore known.

Another object of the present invention is to provide an improved windshield wiper blade which maintains at least one sharp wiping contact edge throughout extended use of the blade.

Yet still another object of the present invention is to provide an improved windshield wiper blade which is relatively inexpensive to manufacture.

In carrying out the above objects and other objects of the present invention, a windshield wiper blade constructed in accordance with the present invention is made of a synthetic elastomeric material comprising an elongated body have a longitudinal axis. A longitudinally extending squeegee rib integral with the body and extending radially outwardly therefrom is provided. The squeegee rib has a pair of side surfaces and an end surface extends perpendicularly to the side surfaces to define a pair of spaced line junctions that provide squeegee edges. A longitudinally extending scraping rib integral with the body projects radially outwardly from the body on either side of the immediately adjacent squeegee rib in the same direction thereof. Each of the scraping ribs has a side surface and an end surface located in a perpendicular relationship with respect to each other to define a line junction that provides a scraping edge. The squeegee rib has a greater radial length than the scraping ribs. A mounting portion including a mounting rib integral with the body and projecting radially outwardly therefrom is located diametrically opposite the squeegee rib. The inherent flexibility of the mounting rib provides a longitudinally extending hinge about which the body can swing in either direction. This arrangement is such that when the blade moves against a windshield, the squeegee edge and the one scraping edge on the side thereof facing in the direction of movement of the blade engage the windshield.

Preferably, each of the scraping ribs has a second side surface also in perpendicular relationship with respect to its end surface so that when the blade moves against the windshield the second side surface of the scraping rib engages the opposing side surface of the squeegee rib on the side thereof facing opposite the direction of movement of the blade to effect lateral stiffness of the squeegee rib.

Also, preferably, the second side surface of each scraping rib is located in parallel relationship with the opposing side surface of the squeegee rib.

The preferred material for the blade is polyester elastomer, such as "Hytrel" manufactured by E.I. duPont de Nemours & Co., Inc. This material has been found to have an excellent combination of physical and chemical properties and it can be extruded in the multi-rib configuration described above. This material has been utilized in many living hinge applications with excellent long-term results. Furthermore, available wear life data indicates that Hytrel should outlast other various rubber compounds by significant factors. This material has been found to be extremely durable in both a mechanical and chemical sense and to have an excellent balance of hardness, flexibility, rigidity, abrasive characteristics and resilience.

This material can be extruded into a predetermined configuration and then slit in two places on opposite sides of the squeegee rib to form the scraping ribs on opposite sides of the squeegee rib. In particular, the improved windshield wiper blade of the present invention may be manufactured by the process of extrusion to produce a single piece structure, combining the blade and spine into a single unit. The wiping portion of the blade is configured to present multiple 90 degree edges to the wiping surface whereby scraping edges of the scraping ribs remove the bulk of the material, thereby removing any abrasive contact from the squeegee rib and allowing it to only do the final squeegee action on the windshield surface. Consequently, scraping edges provide protection for the squeegee edges.

The extruded multi-rib blade of the invention can be very easily used to replace worn-out wiper blades of any design or length by cutting the required length from a longer length and then attaching the cut lengths to an existing wiper blade backing member or holder.

The windshield wiper blade constructed in accordance with the present invention presents numerous advantages. For example, the wiper is less visible both in operation and in its stored position. Because of the unitary structure, the overall height of the blade-spine combination is reduced. This has substantial effect on windlift characteristics to allow the use of lower blade arm pressures. Lower blade arm pressures are desirable since high pressures lead to wiper smear. The overall wiping action of the blade should not deteriorate due to the protective aspects of the scraping edges Furthermore, the configuration minimizes dirt and ice trapping through elimination of recesses.

Since the blade and the spine (i.e. mounting portion) are extruded together continuous length production is provided and no insertion operation of the blade into the spine is required, thereby lending itself to fully automated production of wiper blades. Other advantages include the elimination of the necessity for holding tolerances for assembly.

An extended mandrel on the extruder can provide a controlled base for slitting. Plastic extrusion or co-extrusion is a somewhat more controllable process with fewer variables and the material is more uniform than batched rubber compounds. Consequently, scrap should be substantially reduced.

Also, with plastic elastomers there is no post-extrusion curing required and plant space and energy requirements are reduced. Manufacturers of slitting equipment and commercial firms for performing these services are able to slit the plastic materials more accurately and with less deformation than other compounds.

Finally, the plastic elastomers can be extruded at higher rates than rubber compounds, thereby increasing productivity. The combination of the above factors offers a relatively cost-effective means for producing quality wiper blades with improved operating characteristics and extended life.

The objects, features and advantages of the present invention are readily apparent from the following detailed description of the best modes for carrying out the invention when taken in connection with the following drawings.

BRIEF DESCRIPTION OF THE DRAWINGS

FIG. 1 is a fragmentary perspective view of a conventional form of a motor vehicle illustrating the manner in which a windshield wiper blade of the present invention may be operatively associated with a wiper arm assembly of the vehicle;

FIG. 2 is a sectional view of a first embodiment of a windshield wiper blade of the present invention; and FIG. 3 is a sectional view of a second embodiment of the present invention.

BEST MODES FOR CARRYING OUT THE INVENTION

A windshield wiper blade constructed in accordance with the present invention is generally indicated at 10 in FIG. 1. The wiper blade 10 is shown associated with a windshield 15 of a motor vehicle, such as an automobile. However, it is to be understood that the wiper blade 10 may be utilized with other types of vehicles having windshields that need to be cleaned, such as airplanes, boats and the like.

The wiper blade 10 comprises an extruded synthetic elastomeric blade adapted to be accepted in a wiper blade holder 12. The blade holder 12 is adapted to be connected to an arm 13 of a wiper drive mechanism in a conventional manner. The preferred material for the blade 10 is extruded synthetic rubber, particularly polyester elastomer, such as "Hytrel" manufactured by E. I. duPont de Nemours & Co., Inc.

The blade 10 includes three integral ribs, generally indicated at 14, 16 and 18, which extend the length of the blade 10 and which project radially relative to a longitudinal axis 20 of an upper tubular body portion, generally indicated at 22. The central rib 16 comprises a squeegee rib and the ribs 14 and 18 on opposite sides of the squeegee rib 16 are scraping ribs. The squeegee rib 16 is longer than the scraping ribs 14 and 18. The squeegee rib 16 performs a squeegee action to thereby remove essentially all liquid from the windshield.

The squeegee rib 16 has a pair of side surfaces 24 and an end surface 26 that extends perpendicularly to the side surfaces 24 to define a pair of spaced line junctions that provide squeegee edges 28. Likewise, each of the scraping ribs 14 and 18 has a pair of spaced side surfaces 30 that extend perpendicularly to an end surface 32 to define a pair of spaced line junctions, the outer one of which defines a scraping edge 34.

The wiper blade 10 also includes a mounting portion, generally indicated at 35 an end portion of which is adapted to be received and retained within the wiper blade holder 12 The mounting portion 35 includes a radially projecting mounting rib 36 which is sufficiently flexible to serve as a hinge when the end portion of the mounting portion 35 is fixedly secured in the wiper blade holder 12. The end portion of the mounting portion 35 may be contoured as desired, as further illustrated in the second embodiment of the present invention in FIG. 3, provided that the contour can be gripped by the wiper blade holder 12 in a manner that precludes relative rotation therebetween.

As shown in FIG. 2, the tubular body portion 22 includes an upper curved section 38 which mates with and is integrally formed with a lower curved section 40 of the tubular body portion 22. The upper section 38 supports the mounting rib 36 and the lower section 40 supports the squeegee and scraping ribs 16, 14 and 18, respectively.

By contrast, in the embodiment of FIG. 3, the lower section 40' supports not only the squeegee and scraping ribs 16', 14' and 18', but also supports the mounting rib 36'.

As the blade 10 moves over the windshield 15 to the left as illustrated in FIGS. 1 and 2, the body portion 22 of the blade 10 rotates slightly counterclockwise due to the friction between it and the windshield 15 and due to the flexibility of the mounting rib 36. In this position, the leftmost scraping edge 34 of the scraping edge 14 and the leftmost squeegee edge 28 of the squeegee rib 16 engage the windshield 15. Also, the leftmost side surface 30 of the scraping rib 18 fully engages the opposing or rightmost side surface 24 of the squeegee rib 16 (i.e. on the side facing opposite the direction of movement of the blade 10) to affect lateral stiffness of the squeegee rib 16. In this way the scraping rib 18 opposite the direction of movement of the blade 10 supports the squeegee rib 16.

The body portion 22 also functions as a snow and ice pusher thereby reducing scraping loads on the scraping ribs 14 and 18 in the event of snow and/or ice on the windshield 15 in that the body portion 22 functions as a pusher as it moves over the windshield 15.

The primary action of the scraping ribs 14 and 18 is to clear away heavy rain, snow, sleet and foreign materials, such as insects and road dirt. Preferably, the scraping ribs 14 and 18 are shorter and hence less flexible than the central squeegee rib 16 and are flexed to a lesser extent than the squeegee rib 16 due to contact with the windshield 15. However, the central squeegee rib 16 prevents the scraping ribs 14 and 18 from flexing an excess amount due to the side by side relationship between the scraping ribs 14 and 18 and the central squeegee rib 16.

When the blade 10 reaches the end of its stroke and reverses directions, the blade 10 will turn clockwise as a result of friction between the blade 10 and the windshield 15, flexibility of the mounting rib 36 and the inherent resilience of the blade 10 due to its tubular construction. The tubular cross-section of the blade 10 further maximizes the ability of the blade 10 to conform to contours of the windshield 15 while minimizing lateral deflection and its resulting distortion of the ribs 14, 16 and 18. The edges 34 and 28 of the scraping and squeegee ribs 14, 18 and 16, respectively, are all sharp and form a 90 degree angle at the point of contact with the windshield 15.

FIG. 3 illustrates a second embodiment of a wiper blade, generally indicated at 10', constructed in accordance with the present invention. Those parts of the wiper blade 10, which have the same or similar functions to the parts illustrated in FIG. 2 have the same reference numeral but are given a prime designation.

The blade 10 is preferably manufactured by an extrusion process which allows continuous length production so that the blade can be cut to required sizes in a fully automated process. An extended mandrel on the extruder could provide a control base for slitting the scraping ribs 14 and 18 from the central squeegee rib 16. Because the blade is made from a plastic elastomer, such as Hytrel, the blade can be split more accurately and with less deformation than with conventional rubber compounds. Finally, such plastic elastomers can be extruded at higher rates than rubber compounds. Also, there is no post-extrusion curing required.

A windshield wiper constructed in accordance with the above provides numerous additional advantages. For example, the windshield wiper blade can be produced at a relatively low cost, yet the wiper blade has an improved quality resulting in improved operating characteristics and extended life. Also, by making the windshield wiper blade as an integral or unitary structure, tolerances for assembly are eliminated and fewer assembly steps are required.

While the best modes for carrying out the invention have herein been described in detail, those familiar with the art to which this invention relates will recognize various alternative designs and embodiments for practicing the present invention as defined by the following claims.

What is claimed is:

1. A unitary windshield wiper blade made of an extruded synthetic elastomeric material comprising:
   an elongated body having a longitudinal axis;
   a longitudinally extending squeegee rib integral with said body and extending radically outwardly therefrom, said squeegee rib having a pair of side surfaces and an end surface that extends perpendicularly to the side surfaces to define a pair of spaced line junctions that provide squeegee edges;
   a longitudinally extending scraping rib integral with said body and projecting radially outwardly from said body on each side of and immediately adjacent the squeegee rib in the same direction of the squeegee rib, each of said scraping ribs having a side surface and an end surface located in a perpendicular relationship with respect to each other and having a line junction defining a scraping edge, said squeegee rib having a greater radial length than said scraping ribs; and
   a mounting portion including a mounting rib integral with said body and projecting radially outwardly from and at a location diametrically opposite said squeegee rib, the inherent flexibility of said mounting rib providing a longitudinally extending hinge about which said body can swing in either direction, the arrangement being such that when said blade moves against a windshield, the squeegee edge and the one scraping edge on the side thereof facing in the direction of movement of the blade engages the windshield wherein each of said scraping ribs has a second side surface located in perpendicular relationship to its end surface and in parallel, abutting relationship with the opposing side surface of said squeegee rib, the second side surfaces and the opposing side surfaces being formed by slitting on opposite sides of the squeegee rib, and wherein when said blade moves against the windshield, the second side surface of the scraping rib fully engages the opposing side surface of said squeegee rib on the side thereof facing opposite the direction of movement of said blade to further effect laterally stiffness of said squeegee rib.

2. The wiper blade as claimed in claim 1 wherein said body includes an upper curved section integral with said mounting rib and a lower curved section to support said scraping and squeegee ribs.

3. The wiper blade as claimed in claim 1 wherein said body includes an upper section integral with the mounting portion and a lower section for the support of said scraping, squeegee and mounting ribs.

4. The wiper blade as claimed in claim 1 wherein the radial length of each of the scraping ribs is more than one-third but less than the radial length of the squeegee rib.

* * * * *